(12) United States Patent  (10) Patent No.: US 8,166,535 B2
Coburn                                (45) Date of Patent:       Apr. 24, 2012

(54) UNIVERSAL MEDIA FIREWALL

(75) Inventor: Douglas Coburn, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1071 days.

(21) Appl. No.: 11/973,757

(22) Filed: Oct. 10, 2007

(65) Prior Publication Data

US 2009/0100513 A1    Apr. 16, 2009

(51) Int. Cl.
*H04L 29/06* (2006.01)
(52) U.S. Cl. ......................................................... 726/11
(58) Field of Classification Search .................. 726/1, 2, 726/11–15, 26–30; 713/153, 154; 705/50, 705/51, 56, 57
See application file for complete search history.

(56) References Cited

U.S. PATENT DOCUMENTS

| | | | |
|---|---|---|---|
| 5,987,606 A * | 11/1999 | Cirasole et al. ................. | 726/11 |
| 7,046,139 B2 | 5/2006 | Kuhn et al. | |
| 7,114,167 B2 | 9/2006 | Slemmer et al. | |
| 7,140,033 B1 | 11/2006 | Durden et al. | |
| 2001/0056354 A1* | 12/2001 | Feit et al. .......................... | 705/1 |
| 2004/0031056 A1 | 2/2004 | Wolff | |
| 2005/0155052 A1 | 7/2005 | Ostrowska et al. | |
| 2005/0216949 A1 | 9/2005 | Candelora et al. | |
| 2005/0228881 A1* | 10/2005 | Reasor et al. ................. | 709/224 |
| 2006/0056458 A1 | 3/2006 | Evensen et al. | |
| 2006/0184632 A1 | 8/2006 | Marino et al. | |
| 2006/0272014 A1 | 11/2006 | McRae et al. | |
| 2007/0013515 A1 | 1/2007 | Johnson et al. | |
| 2007/0124785 A1 | 5/2007 | Marsico | |
| 2007/0150918 A1* | 6/2007 | Carpenter et al. ............... | 725/25 |
| 2007/0245398 A1* | 10/2007 | Roden ........................... | 725/133 |
| 2008/0123855 A1* | 5/2008 | Thomas ........................ | 380/277 |

OTHER PUBLICATIONS

"Hardware Innovation for Windows," http://download.microsoft.com/download/5/b/5/5b5bec17-ea71-4653-9539-204a672f1_1cf/hm-concept.doc, 2004.
"Home Networking Solutions," http://www.epsitsolutions.com/marketex.htm, 2005.
Home Services, http://www.francetelecom.com/sirius/rd/en/ddm/en/technologies/ddm200202/print_index1, 2006.

* cited by examiner

*Primary Examiner* — Gilberto Barron, Jr.
*Assistant Examiner* — Malcolm Cribbs
(74) *Attorney, Agent, or Firm* — Wolf, Greenfield & Sacks, P.C.

(57) ABSTRACT

A universal media firewall allows a parent to control filtering of multiple media providers via a single firewall policy. The firewall(s) may be a stand-alone device or may be preformed with software on a home computer or at a remote site. Parental controls are accessible by the media provider so that media is filtered according to the parental settings prior to entering the home media network.

20 Claims, 7 Drawing Sheets

UNIVERSAL MEDIA FIREWALL

BACKGROUND

With the increasing amount of media content entering the home, parental controls are becoming more prevalent. Currently, each media provider, whether telephone, television or internet, must have its own dedicated parental control device, which may become ineffective against local users.

Technologies for parental control of internet content exist, but they offer limited protection unless the filtering is done by the Internet Service Provider (ISP) itself. In such a case, however, customization of the filtered content is difficult.

With regard to television, access is often sold in channel packages. In order to obtain a channel that a parent wants, he or she may have to also purchase additional channels that he or she may deem inappropriate. Further complicating controlling the content is that some stations broadcast both appropriate and inappropriate content so the parent needs suitable tools to filter inappropriate programming per program. Some cable television providers offer cable boxes that have some parental control features built in but not without limitations. For example, each television set would require a separate parental control device, requiring each to be individually set-up and maintained and requiring synchronization of settings, passwords and other user selections.

Of course, because each provider requires its own filtering device, different commands must be entered for each, rendering set up procedures difficult and cumbersome.

SUMMARY

Applicants have appreciated that a single parental control interface for controlling a firewall that filters internet, television, radio, cellular telephone and/or other media content entering the home would be desirable. Aspects of the invention are directed to such an arrangement. In one embodiment, a universal media firewall that runs at the home media perimeter is provided. In this manner, the media lines connect to (and possibly authenticate with) the firewall before they connect to the home network. Parental control settings and authentication credentials are set on the universal media firewall so that content can be filtered before being sent through the home network. In one embodiment, users who connect their computers to the home network are not able to bypass parental control settings or clear audit logs. In another embodiment, all or portions of the universal firewall are located at a remote site and is accessible by the media provider so as to obtain the parental control data. In this manner media is filtered before being sent to the home. Because the universal media firewall provides is a single interface arrangement, it can use the same settings to filter and audit incoming and outgoing television content, telephone calls, and internet communication.

In one embodiment, a parental control arrangement for limiting access to content or communication from a media provider is provided. The arrangement includes a firewall constructed and arranged to be programmed through a single interface by an administrator with desired parental controls for use by a plurality of providers. The parental controls are formatted into a protocol accessible by each provider whereby content or communication supplied by the provider to a media component is filtered according to the parental controls.

In another embodiment, a system for limiting access to content or communication from a provider is provided. The system includes a home network having of a plurality of media components adapted to communicate with a corresponding plurality of media providers. The system also includes a firewall constructed and arranged to be programmed through a single interface by an administrator with desired parental controls for use by the plurality of providers. The parental controls are formatted into a protocol accessible by each provider whereby content or communication supplied by the provider to the media component is filtered according to the parental controls.

In yet another embodiment, a method for limiting access to content or communication from a provider is provided. The method includes hosting a firewall programmable by a home administrator to set parental controls for a home network and receiving an electronic communication of the parental controls form the home administrator. The method also includes configuring the parental controls into a plurality of formats recognizable by a corresponding plurality of media providers and allowing each media provider to access the formatted parental controls prior to streaming media to the home network.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Aspects of the invention relates to a universal parental control firewall that can filter any form of electronic media that streams into the home. The firewall is arranged such that a single interface is provided whereby a parent administrator can control content from multiple media providers. Although there may be more than one firewall that filters media content, in one embodiment, a single interface is provided, giving the administrator easy control over multiple media providers and/or multiple media types. The firewall may be formatted to allow the administrator to perform an audit to determine the effectiveness of the controls and/or to determine user compliance. In one embodiment, the firewall is located between the communication connections entering the home and the home network. In this manner, a single dedicated arrangement is provided that limits the ability to circumvent the filtering controls by users of media components (television, computers, telephone, cellular, etc.) that connect to the media downline of the firewall. In another embodiment, the firewall is a virtual firewall located at a remote site that acts to prevent undesired content from entering the home network. Such a virtual firewall will be discussed in more detail below.

It should be appreciated that the term "firewall" refers to any arrangement(s), device(s) or technique(s), whether implemented in software, hardware or multiples thereof. The components of such a firewall can be located closely together or may be remote from one another, as the present invention is not limited in this respect.

As mentioned, preferably, the universal media firewall is the first contact with all media content that is streamed to the home. The core function of the universal media firewall is to filter media content via a parental control policy. As also mentioned the universal media firewall can also function to audit media access. The universal media firewall cooperates with existing Microsoft Internet parental control technologies, telephony APIs and Media center guide information to block selected inappropriate cable programming, web sites, and/or known or unidentified incoming telephone calls before it enters the home network. As such, in one embodiment, the firewall and/or firewall interface may act to unify on-line policy stores, audit logs, firewall device APIs for communication with the policy store, and the overall administrator experience in managing and/or controlling the firewall. The firewall and/or firewall interface may act to unify other components, as the present invention is not limited in this respect. In addition, other suitable parental control technologies may be employed, as the present invention is not limited in this respect.

The parental controls may be selected by the parent (also referred to as the administrator) to meet his or her concerns. That is, the parent can select preset levels of filtering, depending on the needs of each user or can completely customize filtering, as desired. Similarly, the firewall can be programmed so that different filtering levels and/or customization may be selected for differing media providers. In this manner, the level of cable filtering may be different from the level of telephone filtering, for example. Furthermore, the firewall may allow the parent to set individual credentials so that multiple users on the home network may have differing levels of filtering.

The firewall may also be formatted to allow the parent to set user time limits on one or more of the components, such as user time limits on television, internet, and phone usage. Further, the firewall may be formatted to allow telephone messages to be stored on a plurality of answering machines or voice mail systems, with each answering machine/voice mail system having a predetermined level of protection. That is, messages containing material deemed inappropriate for one user of an answering machine/voice mail system may be routed to a different user's answering machine/voice mail system having a different level of filtering, thereby allowing the content to be recorded.

Similarly, incoming live phone calls may be routed to a separate telephone extension, depending upon the phone number from which the call was made. In this manner, pre-stored phone numbers may be routed to certain pre-selected phone extensions in the home. It should be appreciated that phone service could be in the form of a land-line, cellular, satellite, VOIP, or other suitable voice communication systems, as the present invention is not limited in this regard.

The firewall may be formatted to allow the parent to run an audit to determine compliance. Audit logs can be viewed as per user activity reports.

In one embodiment, the firewall requires authentication between the firewall and the media provider to prevent or reduce the chance of bypassing the parental control firewall.

Aspects of the present invention described herein can be implemented in any of numerous arrangements. For example, in one embodiment, the firewall may be configured as a stand-alone device located on the home perimeter so as to filter content before the media enters the home network. In one embodiment, the firewall may be configured as software that is installed on the home computer. Media connections would be made to the home computer and the software firewall would act to filter content before the media is sent through the home network. Of course, instead of a software package that is installed on the home computer, all or portions of the firewall software may reside at a remote location, such as a web-accessible third party. In this manner, the parent would logon to the remote site and manage the firewall settings from the home or other computer. Other suitable arrangements may be employed, as the present invention is not limited in this respect.

In one aspect, once the parent administrator sets the filtering commands on the firewall, the parental control data is made available at a host site where each media provider can access the filtering information and filter content accordingly for that particular home before the media enters the home. In this way, the parent need only set the controls for the entire home network and each provider would obtain the control data from a third party's host site. In one aspect, this third party may be one of the service providers or may be a different party.

The firewall may be configured in any suitable manner, as the present invention is not limited in this respect. In one embodiment, a computer-readable medium having computer-executable instructions may be provided whereby the computer-executable instructions is adapted to perform, when executed, at least portions of the process performed by the firewall, as described herein.

Figure 1:
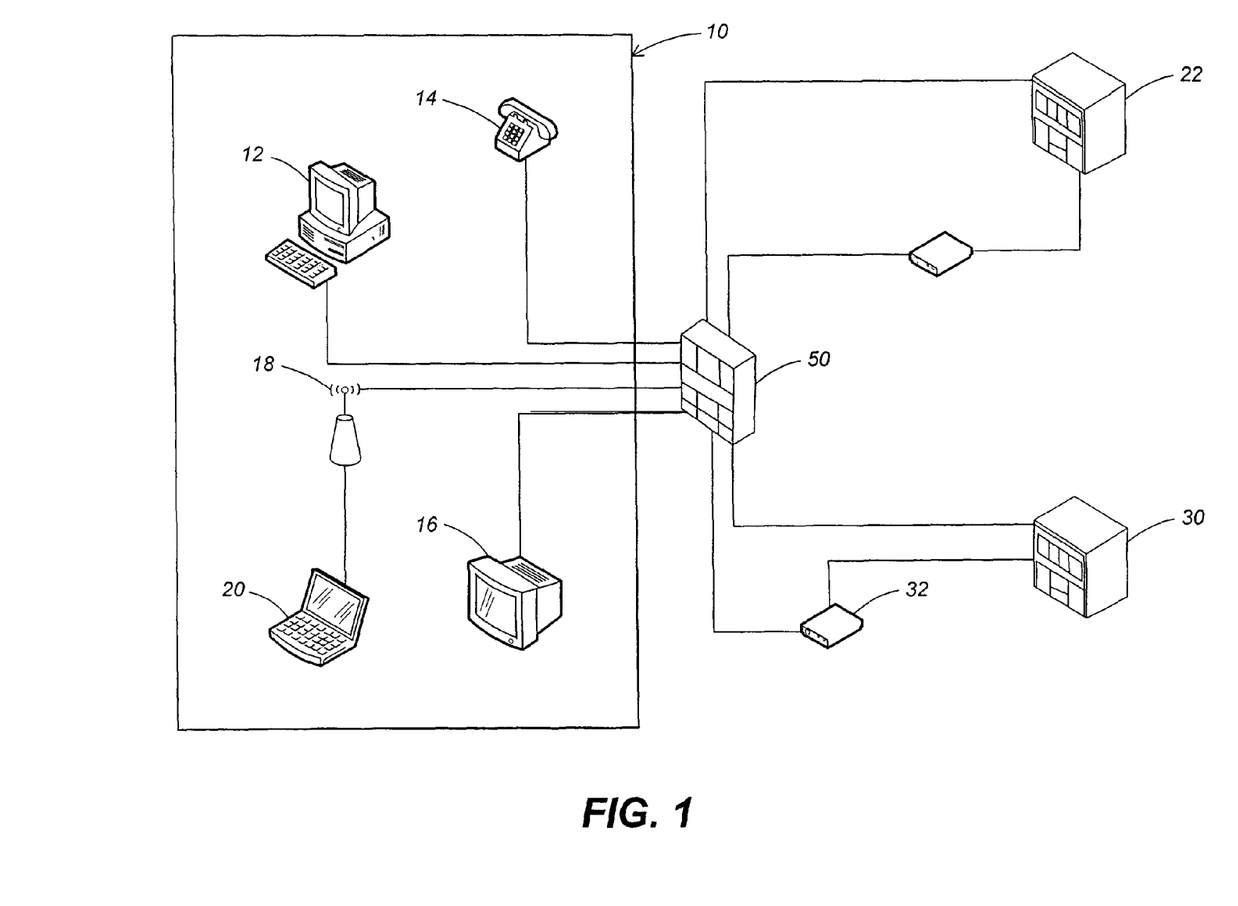
FIG. 1 is a diagrammatic representation of a home network coupled to various media providers with a universal media firewall according to one embodiment.

Turning now to FIG. 1, a home network coupled to various media providers is shown. In FIG. 1, home network 10 may include several media components including a home PC 12, a telephone system 14, a cable television/entertainment system 16, wireless internet connection 18, and various computers, such as laptop 20. Computer 20, is shown as a laptop, however, the computer may include any other computing device including a desktop, a personal digital assistant, a smart phone, or any other computing device. Telephone system 14 may include in-house wired telephone as well as cellular service and cellular telephones, satellite service, VOIP, etc. that may be included in the home network. Similarly, television/entertainment system 16 may include any television set connected to a cable source as well as any home entertainment system including subscriber based radio.

Continuing with reference to FIG. 1, the home network may be adapted to communicate with various media sources. For example, the home network 10 may be adapted to communicate with a cable company 22 offering television, radio, and/or internet. In addition, the home network 10 may be adapted to communicate with phone company 30 that is adapted to provide any type of phone service. In addition, phone company 30 may be adapted to provide an internet connection through a DSL modem 32.

Aspects of the invention are directed to a universal media firewall that is adapted to filter various media content entering the home network. Thus, as shown in FIG. 1, the universal media firewall 50 is located at the perimeter of the home network and is adapted to receive the media connection from the various media providers and filter content before entering the home network.

As discussed above, the universal media firewall 50 may be programmed to filter certain content before entering the home. The universal media firewall 50, in one embodiment, may be configured to communicate with a home computer so that a parent administrator may access the universal media firewall 50 and control the filtering settings. Thus, a parent may enter commands on desktop computer 12, for example, in order to control media flow through the universal media firewall 50. Alternatively, the universal media firewall 50 may have its own user interface such that the parental controls may be programmed directly onto the firewall without the need for a computer to access the firewall 50.

Figure 2A:
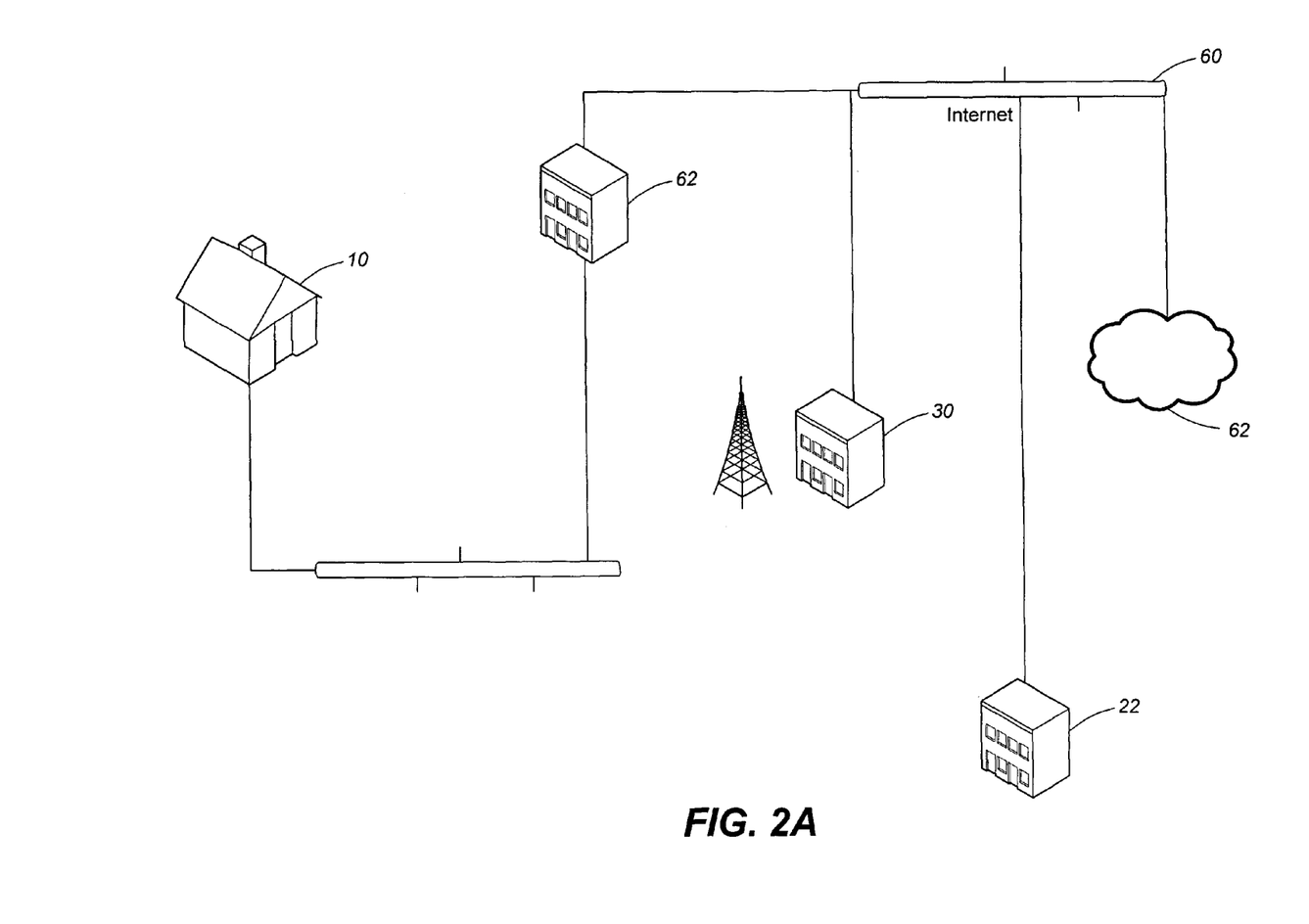
FIG. 2a is an alternative arrangement of a home network coupled to various media providers with an alternative arrangement of a universal media firewall.

Referring to FIG. 2A, an alternative embodiment of the universal media firewall will be discussed. In this implementation, the universal media firewall is akin to a virtual firewall wherein a user can set the controls at a remote site or location, the access to which can be obtained by the media providers. In this regard, as shown in FIG. 2A, a home network 10 may be connected to the internet 60 via an internet service provider 62. Other media providers, such as a television/entertainment provider 22 and a voice provider 30 may also be able to communicate with the internet 60. As shown in FIG. 2A, a policy store 66 may also communicate with the internet 60.

Figure 2B:
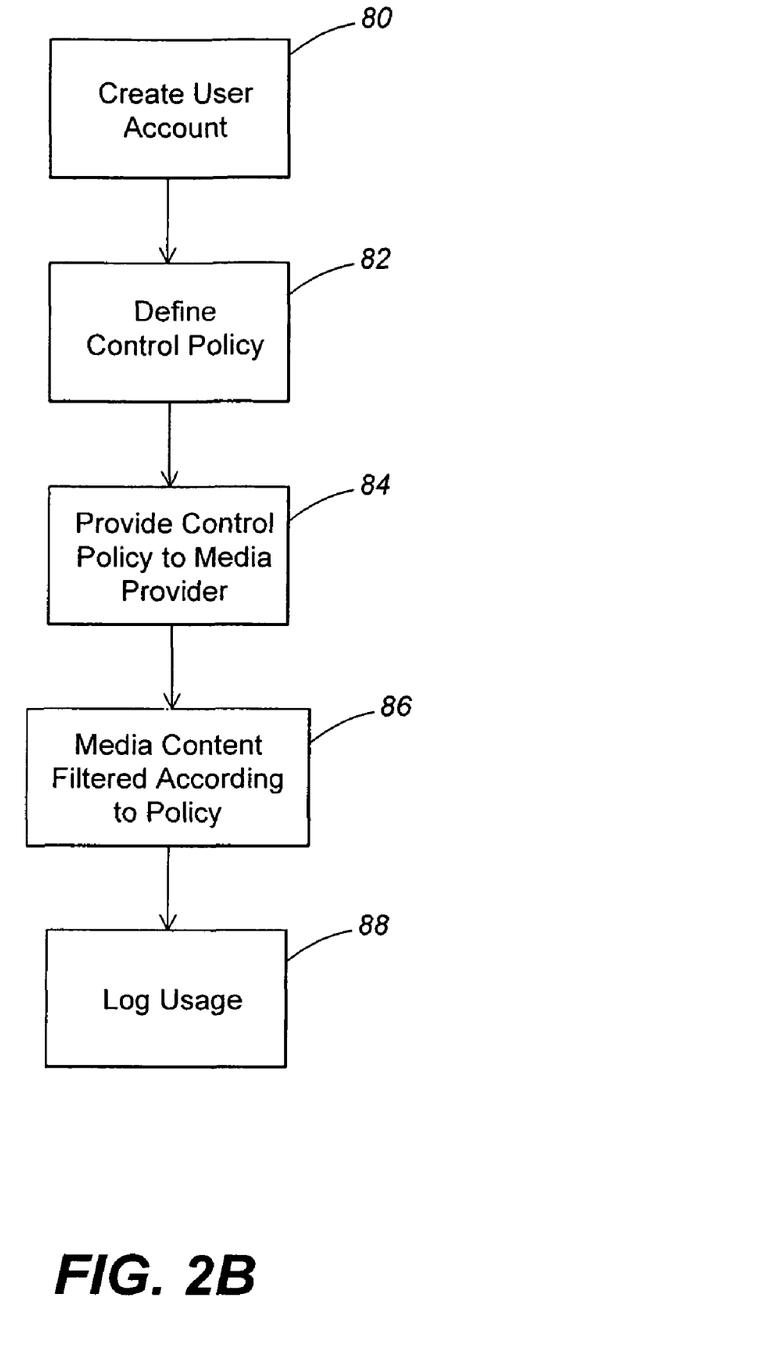
FIG. 2b is a flow chart of one embodiment of a process for setting controls on a universal media firewall.

In use, and as shown in FIG. 2B, a user creates an account at a remote location, as shown at block 80, FIG. 2B. The account may include user information including a password and other identifying information, as may be necessary. Through a suitable user interface, the user can define a control policy, as indicated at block 82. This control policy may thereafter reside on the policy store 62 (see FIG. 2A). As shown at block 84, any media provider connected with the home network can access the policy store and obtain the control policy previously defined by the home network user. Thus, continuing at block 86, any media from any of the media providers that enters the home network will be filtered according to the policy residing at the policy store 60. In addition to filtering, as mentioned, the universal media firewall can store compliance information. Accordingly, the parent can access a data base and download or view information regarding the usage of the media and the media content entering the home network.

At block 88, the parent administrator can access compliance data.

As can be appreciated, universal media firewall 50 is not limited to a physical device that can be used on the home network. Rather, the universal media firewall 50 can be a virtual firewall residing at a remote site where the administrator can access the universal media firewall and define the requisite parental controls.

In another embodiment, the administrator can define a set of controls and upload the information to a firewall provider. Thus, rather than have each media provider access the policy store for the parental controls for the given home network, the administrator can custom order a physical universal media firewall device and have it shipped to his/her house for installation at the perimeter of the home network, as indicated above.

Other suitable arrangements for implementing the universal media firewall may be provided, as the present invention is not limited in this respect.

Figure 3:
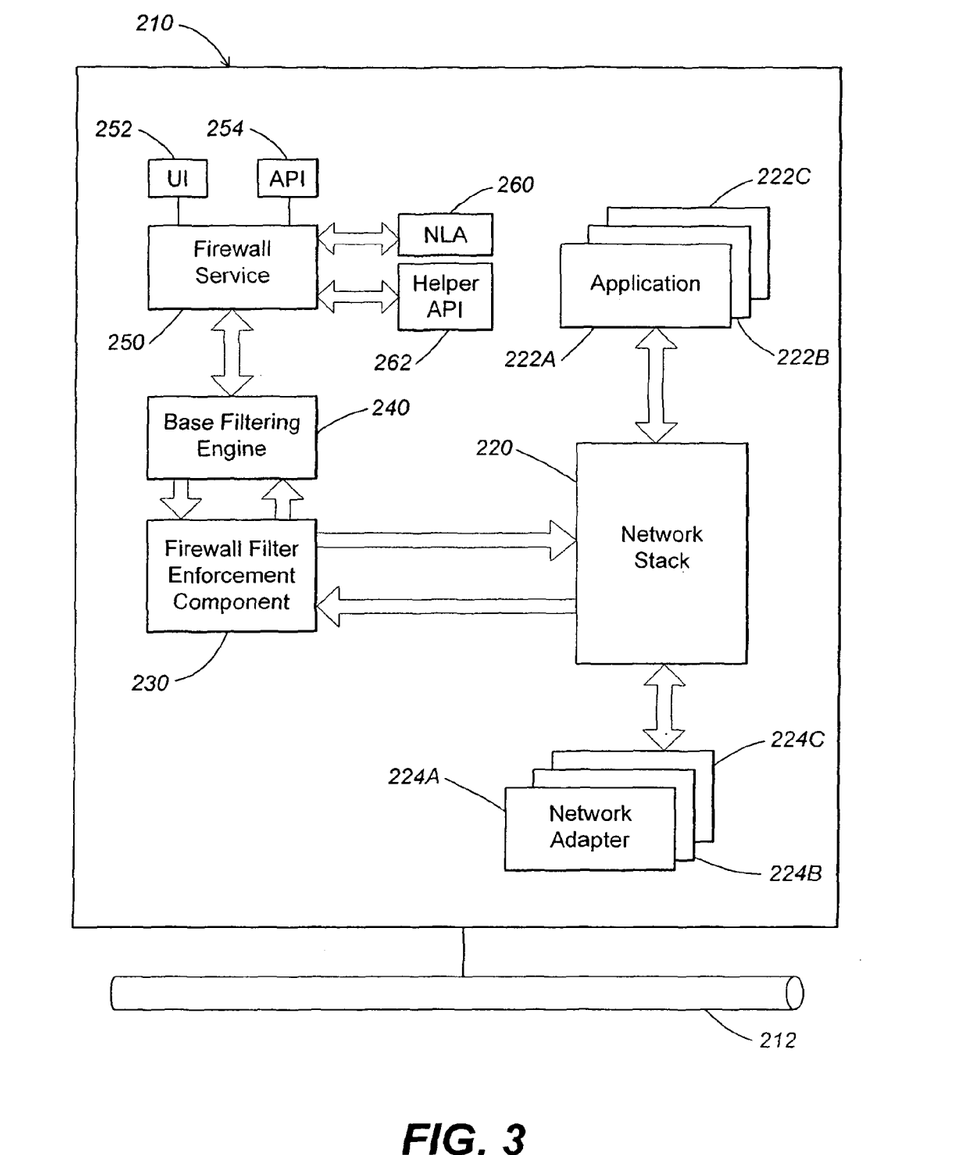
FIG. 3 is an architectural block diagram of one embodiment of a universal media firewall.

FIG. 3 is an architectural block diagram of one embodiment of a universal firewall device 210, which may be any device configured to cooperate with one or more media networks. In the embodiment illustrated, a wired media network 212 is illustrated. However, the device may interface to multiple wired and/or wireless media networks.

Regardless of the specific type of media networks to which the device 210 is connected, it may be configured with one or more software components stored in a suitable computer-readable medium and adapted to control media traffic entering the home network. Those components may process both incoming and outgoing media network traffic and firewall filtering could apply to incoming traffic or outgoing traffic or both. The media traffic may be in any suitable form, which is frequently dictated by the protocol used by the network over which the media traffic is communicated. In some instances, media traffic will be in the form of TCP or UDP packets, but the specific form of the media traffic is not a limitation on the invention and messages in other suitable forms may be processed according embodiments of the invention.

Device 210 may contain one or more components as is known in the art for processing network traffic. Such components may include network stack 220. In the embodiment illustrated, media traffic passes through network stack 220. Network stack 220 may be a network stack as is known in the art. However, any suitable network stack may be used.

It should be appreciated that the components of the device 210 described herein can be physically integrated into a single device or may be separately wired to form a device, as the present invention is not limited in this regard. Similarly, all or portions of the components may be implemented in either hardware or software and may reside on a host computer adapted to filter content entering the home network.

Network stack 220 receives outgoing messages from applications 222A, 222B and 222C. Here, three applications are shown for simplicity, but networked computer 210 may contain any number or type of applications.

Network stack 220 interfaces with network adapters 224A, 224B and 224C. Each of the network adapters 224A . . . 224C provides an interface for a specific media network, though more than one adapter may be provided to interface to the same network. Though three network adapters are illustrated in FIG. 3, any number or type of network adapters may be used. Each of the network adapters 224A . . . 224C may have operating characteristics to support a specific form of media communication and may be implemented as is known in the art or in any other suitable way.

To provide the parental control, the device, in one embodiment, is configured with a software firewall. The software firewall also may contain components as are known in the art. However, components of the software firewall may be implemented in any suitable way.

In the embodiment illustrated, the software firewall contains a firewall filter enforcement component 230, which may operate to filter media traffic using mechanisms as are known in the art. In the embodiment illustrated, firewall filter enforcement component 230 maintains a set of filters specifying, for each network adapter 224A . . . 224C, media that should be passed or blocked. Firewall filter enforcement component 230 interfaces with network stack 220 to apply these filters to traffic passing through stack 220. As network stack 220 processes the media, it interacts with firewall filter enforcement component 230 to determine whether the media should be passed or blocked.

In the embodiment illustrated, network stack 220 and firewall filter enforcement component 230 may be contained within the kernel of an operating system for a computer system, such as the home computer 12 illustrated in FIG. 1. The filters used by filter enforcement component 230 may be provided from the administrator mode portions of the operating system. The filters may be derived from administrator input or may be derived from execution of scripts or other program elements or otherwise derived in any other suitable way. Regardless of how filters are derived, the firewall filters may be provided to firewall filter enforcement component 230 via an administrator mode component. In the embodiment illustrated, base filtering engine 240 provides those filters to firewall filter enforcement component 230. Base filtering engine 240 may be a base filtering engine as in a conventional firewall. However, base filtering engine 240 may be implemented in any suitable way.

In the embodiment illustrated, base filtering engine 240 receives information defining firewall filters from firewall service 250. As in a firewall service in some known network computers, firewall service 250 may provide one or more interfaces through which firewall rules may be specified. In the embodiment illustrated, interface 252 and application programming interface 254 illustrate interfaces through which firewall rules may be specified.

To operate as desired, firewall service 250 may interface with a network location awareness component 260. Network location awareness component 260 may provide information about the network interfaces maintained by the device 210. Network location awareness component 260 may be implemented using mechanisms as are known in the art and may output for each network interface information about the network that can be accessed through that interface.

Additional information about network interfaces may be obtained through helper API 262. Helper API 262 may be a component as is known in the art, though any suitable implementation may be used. Helper API 262 may be a component configured to interface with network adapters 224A . . . 224C installed in device 210. Through the interface provided by helper API 262, firewall service 250 may obtain additional information about each network interface.

Firewall service 250 may be implemented using technology for implementing a firewall service as is known in the art. However, in the embodiment illustrated, firewall service 250 is configured to receive input specifying firewall rules based on media type. As one example, firewall service 250 may support a set of media types that includes "Internet," "telephone," "cable" or "All."

Firewall rules specified based on media types may otherwise define firewall operation as in prior art firewall rules, though any suitable representation of a rule may be used. For example, as in some prior art firewalls, each rule may specify one or more protocols in which the rule is active. Likewise, the rule may specify one or more profiles in which the rule is active. Also, the rule may specify an action to be performed by the firewall when the rule is triggered. For example, a rule may specify either that message traffic should be blocked or allowed. Other portions of the rule may specify other operating characteristics of the firewall. For example, a rule may specify a state for the rule, such as enabled or disabled. Additionally, rules may be assigned names or other identifiers that allow the rule to be accessed for editing after it is created. All of these characteristic may be specified using mechanisms as known in the art or in any other suitable way.

Regardless of the form in which media type rules are specified, each of the rules may be translated into a format that may be processed by other firewall components. In the embodiment illustrated, firewall components adapted to apply firewall rules specified based on network interfaces are used. Accordingly, the rules specified based on a media type may be translated into one or more rules specifying firewall action based on network interfaces.

Firewall service 250 may convert firewall rules specified for one or more media types to one or more rules applicable to interfaces of the specified media type. Once converted to rules for specific network interfaces, the rules may be passed to base filtering engine 240 where they may be processed as in known firewalls or in any other suitable way.

Figure 4:
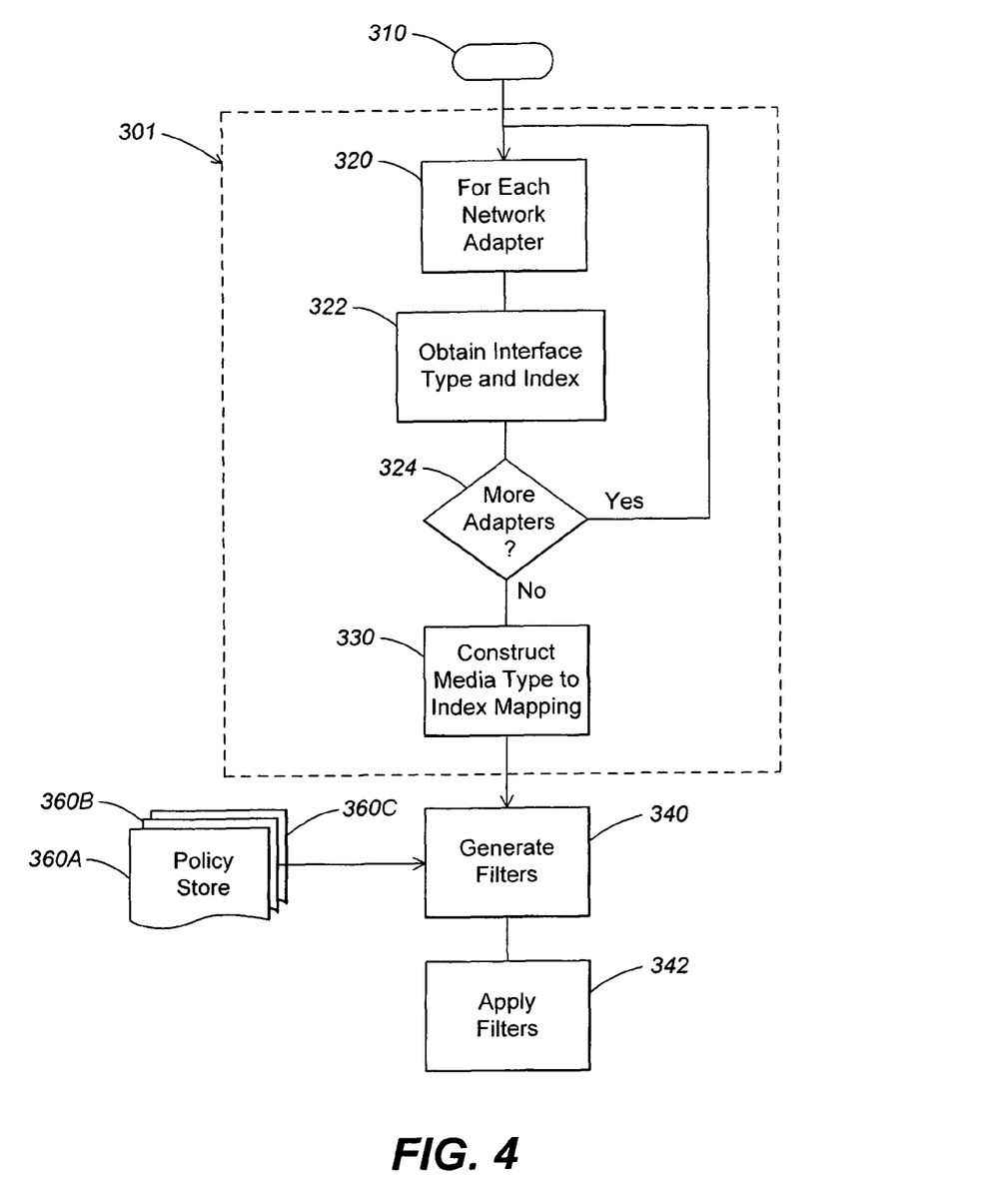
FIG. 4 is a flowchart of one embodiment of a process by which filtering may operate.

FIG. 4 illustrates a process by which filtering according to an embodiment of the invention may operate. The process of FIG. 4 begins at start point 310. The process illustrated in FIG. 4 may be initiated in response to any suitable triggering event. In the embodiment illustrated, the process begins upon administrator instruction. In response, subprocess 301 is initiated to construct a mapping between media types that may be used to specify firewall rules and specific network interfaces maintained by computer 210.

Subprocess 301 begins at loop start 320. Loop start 320 is the start of a processing loop that is performed for each network adapter installed in computer 210. In some prior art systems, the operating system maintains information about each installed network adapter in a format that may be accessed by other operating system services, such as firewall service 250. However, any suitable mechanism may be used to identify the installed network adapters in which the process of FIG. 3 is performed.

Regardless of how the installed network adapters are identified, processing proceeds to block 322. At block 322, for the selected network adapter, information is obtained about the network interface supported by that adapter. In the embodiment illustrated, the information obtained includes an interface type and index. The information obtained at block 322 may be in any suitable form. For example, interface type information may be a parameter defined according to a known standard.

The index obtained by processing at block 322 is an example of information that may be used to identify a network interface supported by the network adapter. In the embodiment illustrated, the information identifying the interface is in a form that allows communication between firewall filter enforcement component 230 and network stack 220. In some prior art systems, specific interfaces are identified by a Locally Unique Identifier (LUID), which may be assigned to each interface as it is formed. The LUIDs may be assigned sequentially, randomly or in any other suitable form. In some embodiments, the locally unique identifier may be a 64 bit number, but the specific form of the LUID is not critical to the invention and any suitable form that uniquely identifies an interface may be used. Regardless of how the LUID is assigned, it may serve as an index for identifying a specific interface and may also be obtained from a network adapter for the interface.

After information is obtained at block 322, the process continues to decision block 324. At decision block 324 the process branches depending on whether further network adapters remain for processing. If further network adapters remain, subprocess 301 loops back to loop start 320 where the processing at block 322 and decision block 324 is repeated for the next network adapter.

Conversely, when all installed network adapters have been processed, processing proceeds to block 330. At block 330, a mapping is constructed to map media types to specific network indexes. Such a mapping is useful in translating rules specified based on media type to rules that are enforced for individual network interfaces.

Figure 5:
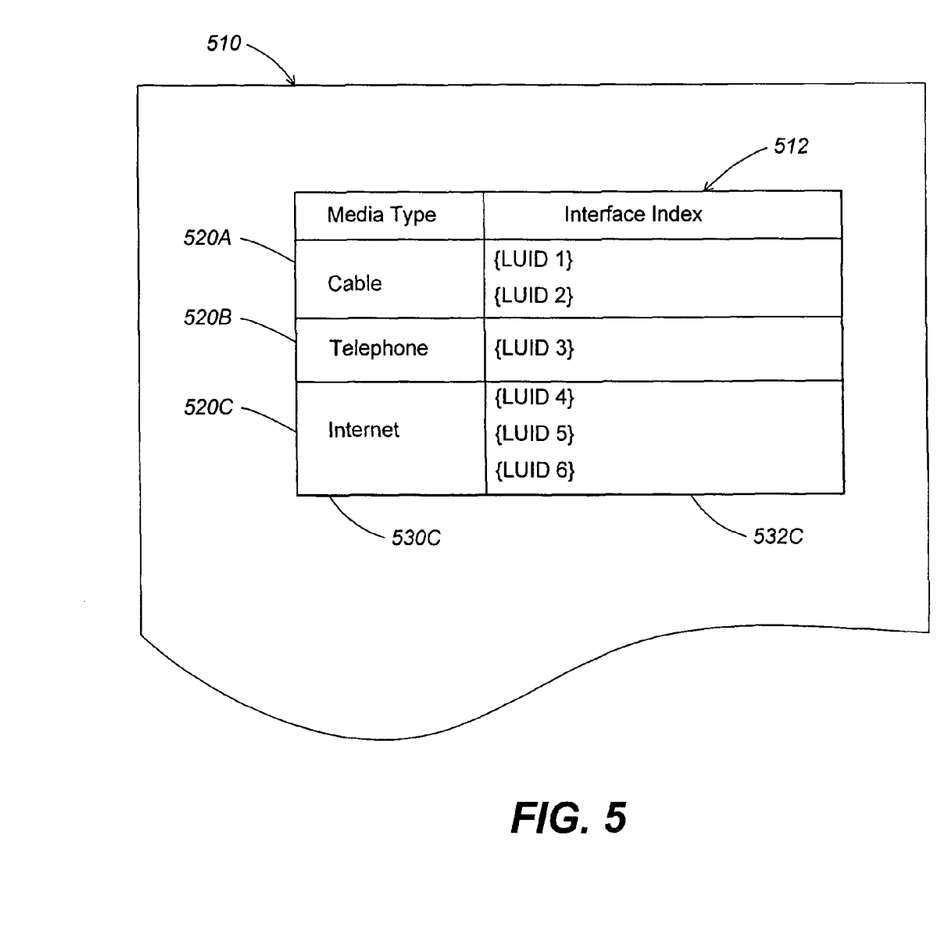
FIG. 5 is a diagrammatic representation of a data structure according to one embodiment.

The mapping created at block 330 may be stored in a data structure or otherwise retained in any other suitable fashion for use in translating rules specified by media type into firewall filters. FIG. 5 provides an example of a data structure storing such a mapping. In the embodiment of FIG. 5, a data structure is shown stored in computer readable media 510. Computer readable media 510 may be any suitable media associated with system 210. Data structure 512 may store information in any suitable form that is useful for performing a mapping between media type and specific network interfaces.

In the embodiment illustrated in FIG. 5, data structure 512 is organized with multiple rows. Here, three rows 520A, 520B and 520C are illustrated. In the embodiment of FIG. 5, each row corresponds to one media type. Accordingly, the embodiment of a data structure illustrated in FIG. 5 corresponds to an embodiment in which three media types have been defined. In the specific example of FIG. 5, those media types are "Cable," "Telephone" "Internet." However, the invention is not limited to the specific network types illustrated or to three network types.

Regardless of the specific number or network types defined, each row 520A, 520B or 520C maps a media type to applicable network interfaces of that type. Taking row 520C as illustrative, the row contains a field 530C storing a value identifying a network type. In FIG. 5, field 530C stores a value "Internet."

Row 520C also includes a field 532C, containing information defining network interfaces that are of the type specified by the value in field 530C. In the embodiment illustrated, field 532C may store multiple values, each identifying a network interface. In the embodiment illustrated, network interfaces are identified by indexes which are stored in field 532C. In FIG. 5, three network interface indexes "LUID 4," "LUID 5" and "LUID 6" are shown in field 532C.

In the example of FIG. 5, row 520C shows a mapping between one media type, "Internet," and three network interface indexes, "LUID 4," "LUID 5" and "LUID 6." However, the number of network interface indexes associated with each media type is not a limitation on the invention. For example, row 520A shows a mapping between one network type and two network interface indexes. Row 520B shows a mapping between one media type and one network interface index. However, zero or more network interface indexes may be mapped to each network interface type, with the specific number depending on the network configuration of the device 210.

In constructing a media type to index mapping at block 330, information about the interface types that correspond to each media type may be employed in conjunction with information obtained at block 322 about the interface types of network interfaces established on device 210. This information may be processed in any suitable way to construct the data structure 512. However, in the embodiment illustrated, a schema is defined mapping interface types to network types. With this schema, a media type may be associated with each network interface. The LUID of the network interface may therefore be associated with a specific media type, thereby creating a data structure in the form of data structure 512 (FIG. 5).

Once a mapping as reflected in data structure 512 is constructed, the process of FIG. 4 proceeds from block 330 to block 340. At block 340, the mapping captured in data structure 512 (FIG. 5) may be used to generate one or more firewall filters based on firewall rules that have been specified based on the media type.

In the embodiment of FIG. 5, firewall rules are stored in one or more policy stores, of which three policy stores 360A, 360B and 360C are illustrated. However, any suitable number of policy stores may be used to hold firewall rules. In the embodiment illustrated, different policy stores may be used to contain rules applicable to different media.

Regardless of the number and type of policy stores and the number and types of profiles associated with each policy store, policy stores 360A . . . 360C may provide a set of firewall rules. Some or all of the firewall rules in the policy stores 360A . . . 360C may be defined based on a media type to which they are applicable. At block 340, these rules may be translated into network filters using the media type to index mapping constructed at block 330.

Processing at block 340 may be performed in any suitable way. For example, each of the applicable rules in policy stores 360A . . . 360C that is specified based on a network type may be translated into a set of rules, with one rule for each network interface of the media type defined in the rule. Once rules specified based on media type are translated into rules specified by network interface, the rules may thereafter be translated to firewall filters using a mechanism as known in the art or in any other suitable way.

Accordingly, once filters are generated at block 340 they may be applied at block 342. Processing at block 342 may be performed as in software firewalls as is known in the art, such as by providing the filters to an enforcement component. However, the specific mechanism by which firewall filters are applied is not a limitation on the invention and any suitable mechanism may be employed. Once the filters generated at block 340 are applied at block 342, the firewall within device 210 may operate to selectively block or allow media traffic based on the applicable firewall rules in the applicable policy stores 360A . . . 360C.

Figure 6:
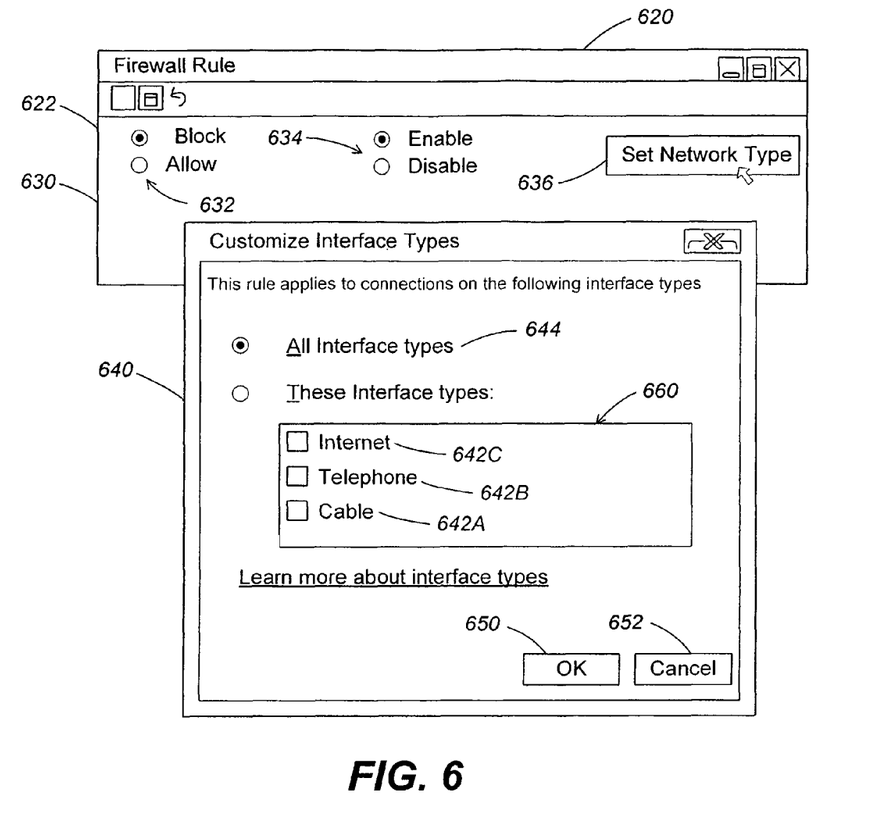
FIG. 6 is an illustrative embodiment of a graphical user interface through which an administrator may control a universal media firewall.

The rules in policy stores 360A . . . 360C may be obtained in any suitable way. As one example, an administrator may provide firewall rules through a user interface. As an example, FIG. 6 illustrates a graphical user interface through which an administrator user may edit or define a firewall rule. The user interface illustrated in FIG. 6 includes window 620 that provides an input area 630 through which an administrator may provide input specifying parameters of a firewall rule. Input area 630 may contain one or more control objects that allow the administrator to easily select values for parameters defining the firewall rule. For example, control objects 632 are illustrated as radio buttons, allowing the administrator to define an action that is performed by the firewall when the rule is applicable. In the example illustrated, control objects 632 allow the administrator to indicate whether the media content subject to the rule is blocked or allowed.

Input area 630 may also include other control objects, such as control objects 634, which allow the administrator to specify whether the rule is enabled or disabled. Other control objects, though not expressly shown in FIG. 6, may allow the administrator to specify values for other parameters, such as a protocol or profile in which the rule is applicable. Additionally, window 620 may contain fields or other objects through which the administrator may input other information defining the rule. For example, window 620 may provide a mechanism for the administrator to input a name or other identifying information for the rule.

Window 620 may also contain control objects to administer the rule. In the embodiment illustrated, window 620 includes toolbar 622. Toolbar 622 may contain one or more tools, such as tools that allow the administrator to create a new rule or save a rule that has been defined.

Window 620 may also include a mechanism that enables the administrator to associate a media type with a rule being defined. In the embodiment illustrated, input area 630 includes a control object 636. Upon selection of control object 636, dialog box 640 may be presented. In the embodiment illustrated, dialog box 640 provides a mechanism through which the administrator may associate one or more media types with a rule.

Dialog box 640 includes an input area 660 through which the administrator may specify one or more media types applicable to the rule being defined in window 620. In the embodiment illustrated, with an enumerated list of media types is presented in input area 660. In the example of FIG. 6, the enumerated network types correspond to those contained in the media type to interface type mapping shown in FIG. 5. The enumerated list presented in input area 660 may contain any number of entries as the present invention is not limited in this regard. Further, it is not a requirement that the number or kinds of media types identified be static. For example, one or more interfaces could be provided to allow specification of media types and associated interface types. Such a feature could be supported, for example, with a tool that expands the data structure storing schema 412 in response to input from a user, a program or other suitable source.

Regardless of the number and kinds of media types depicted in input area 660, the administrator may select one or more of the media types using control objects such as control objects 642A, 642B or 642C. In the embodiment illustrated, control objects 642A . . . 642C are check box control objects, allowing the administrator to specify one or more media types applicable to a rule being defined.

Additionally, dialog box 640 contains button control object 644. Button control object 644 allows the administrator to specify that a rule is applicable to all media types.

Other control objects in dialog box 640 may allow other actions associated with specifying a media type applicable to a rule to be preformed. For example, button 650, when selected, records the information input through dialog box 640. Conversely, button 652 cancels the input provided through dialog box 640 and returns the administrator to window 620.

Figure 7:
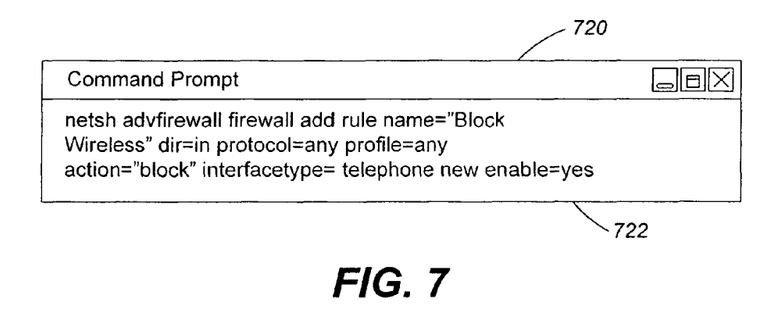
FIG. 7 is an alternative arrangement of an interface through which an administrator may control a universal media firewall.

The graphical user interface of FIG. 6 represents just one example of an interface through which the administrator may specify a firewall rule with an associated media type or types applicable for that rule. An alternative example of an interface might be a simple command line prompt as shown in FIG. 7, as the present invention is not limited in this respect.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer system and/or the firewall may be embodied in any of a number of forms, such as a rack-mounted computer, a desktop computer, a laptop computer, or a tablet computer. Additionally, a computer system and/or the firewall may be embedded in a device not generally regarded as a computer but with suitable processing capabilities, including a Personal Digital Assistant (PDA), a smart phone or any other suitable portable or fixed electronic device.

Also, the computer system and/or firewall may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, the computer system and/or firewall may receive input information through speech recognition or in other audible format.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more communication devices, computers, or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a communication device, computer or other processor to implement various aspects of the present invention as discussed above. Additionally, it should be appreciated that according to one aspect of this embodiment, one or more computer programs that when executed perform methods of the present invention need not reside on a single firewall device, computer or processor, but may be distributed in a modular fashion amongst a number of different devices, computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. At least one non-transient computer-readable storage medium having computer-executable instructions stored thereon for execution by a processor, for implementing a parental control arrangement for limiting access to content or communication from a media provider comprising:
   a firewall constructed and arranged to be programmed through a single interface by an administrator with desired parental controls for use by a plurality of providers, the parental controls being formatted into a protocol accessible and obtainable by each of the plurality of providers whereby content or communication supplied by the provider to a media component is filtered according to the parental controls before being sent to the media component.

2. The parental control arrangement according to claim 1, wherein at least a portion of the firewall is a stand-alone device connected between the providers and the media component to filter content or communication and located relatively proximate the media component.

3. The parental control arrangement according to claim 1, wherein the firewall is hosted by a remote party whereby each media provider is capable of communicating with the remote party to obtain the parental control and filter content prior to transmission to the user.

4. The parental control arrangement according to claim 1, furthering comprising an audit log adapted to be populated with auditing results provided by the plurality of media and adapted to be accessible by the administrator.

5. The parental control arrangement according to claim 1, wherein a parental control for one media provider is different from a parental control for another media provider so that differing filtering levels may be selected for differing media providers.

6. The parental control arrangement according to claim 1, wherein the interface is adapted to allow the administrator to select a parental control from a pre-set plurality of parental controls.

7. The parental control arrangement according to claim 1, wherein the interface is adapted to allow the administrator to customize a parental control for a media provider.

8. The parental control arrangement according to claim 1, wherein the interface is adapted to allow the administrator to individualize different levels of parental control for each of a plurality of users.

9. The parental control arrangement according to claim 1, wherein the interface is adapted to allow the administrator to set a time limit for each of a plurality of users.

10. A system for limiting access to content or communication from a provider, the system comprising:
    a home network comprising a plurality of media components adapted to communicate with a corresponding plurality of media providers;
    a firewall constructed and arranged to be programmed through a single interface by an administrator with desired parental controls for use by the plurality of providers, the parental controls being formatted into a protocol accessible and obtainable by each of the plurality of providers whereby content or communication supplied by the provider to the media component is filtered according to the parental controls before being sent to the media component.

11. The system according to claim 10, wherein the firewall is a stand-alone device connected between the providers and the media component to filter content or communication and located relatively proximate the media component.

12. The system according to claim 10, wherein at least a portion of the firewall is hosted by a remote party whereby each media provider is capable of communicating with the remote party to obtain the parental control and filter content prior to transmission to the user.

13. The system according to claim 10, wherein the firewall includes an audit log adapted to be populated with auditing results provided by the plurality of media and adapted to be accessible by the administrator.

14. The system according to claim 10, wherein a parental control for one media provider is different from a parental control for another media provider so that differing filtering levels may be selected for differing media providers.

15. The system according to claim 10, wherein the interface is adapted to allow the administrator to select a parental control from a pre-set plurality of parental controls.

16. The system according to claim 10, wherein the interface is adapted to allow the administrator to customize a parental control for a media provider.

17. The system according to claim 10, wherein the interface is adapted to allow the administrator to individualize different levels of parental control for each of a plurality of users.

18. The system according to claim 10, wherein the interface is adapted to allow the administrator to set a time limit for each of a plurality of users.

19. A method for limiting access to content or communication from a provider, the method comprising:
    hosting a firewall programmable by a home administrator to set parental controls for filtering content or communication before entering a home network;
    receiving an electronic communication of the parental controls from the home administrator;
    configuring the parental controls into a plurality of formats recognizable by a corresponding plurality of media providers; and
    allowing each of the plurality of providers to access and obtain the formatted parental controls prior to streaming media to the home network.

20. The method according to claim 19, further comprising:
receiving compliance data from each media provider;
storing the compliance data on an electronic storage medium; and
allowing the home administrator to access the stored compliance data.

* * * * *